(12) United States Patent
Villamor et al.

(10) Patent No.: US 9,921,724 B2
(45) Date of Patent: Mar. 20, 2018

(54) PRESENTING DATA ON A MOBILE DEVICE IN COMMUNICATION WITH AN ON-DEMAND DATABASE SYSTEM

(71) Applicant: salesforce.com, inc., San Francisco, CA (US)

(72) Inventors: Craig Villamor, San Mateo, CA (US); James David Vogt, San Bruno, CA (US); Jason Schroeder, Los Angeles, CA (US)

(73) Assignee: salesforce.com, inc., San Francisco, CA (US)

( * ) Notice: Subject to any disclaimer, the term of this patent is extended or adjusted under 35 U.S.C. 154(b) by 817 days.

(21) Appl. No.: 14/448,800

(22) Filed: Jul. 31, 2014

(65) Prior Publication Data

US 2015/0052445 A1 Feb. 19, 2015

Related U.S. Application Data

(60) Provisional application No. 61/866,460, filed on Aug. 15, 2013, provisional application No. 61/866,474, filed on Aug. 15, 2013.

(51) Int. Cl.
*G06F 3/048* (2013.01)
*G06F 3/0484* (2013.01)
(Continued)

(52) U.S. Cl.
CPC ...... *G06F 3/0484* (2013.01); *G06F 17/30867* (2013.01); *H04L 67/22* (2013.01); *H04W 4/206* (2013.01)

(58) Field of Classification Search
CPC ... G06F 3/0484; G06F 17/30867; H04L 67/22
(Continued)

(56) References Cited

U.S. PATENT DOCUMENTS 5,577,188 A 11/1996 Zhu
5,608,872 A 3/1997 Schwartz et al.
(Continued)

OTHER PUBLICATIONS

U.S. Appl. No. 14/336,988, filed Jul. 21, 2014, Dayon et al.
(Continued)

*Primary Examiner* — David Phantana Angkool
(74) *Attorney, Agent, or Firm* — Weaver Austin Villeneuve & Sampson LLP

(57) ABSTRACT

Disclosed are methods, systems, and computer program products for presenting data on a mobile device in communication with an on-demand database system. In some implementations, a mobile device receives information identifying one or more data objects stored in the on-demand database system based on captured behavioral data for a user of the mobile device. The captured behavioral data may be based on interactions with the one or more data objects. The mobile device provides the information for display in a user interface for a mobile application. The mobile device provides for display a subset of a plurality of information items in the user interface, the plurality of information items provided from the on-demand database system, the subset determined based on the identified one or more data objects and based on user input received via the user interface. In some implementations, the user input comprises a selected type of data object.

20 Claims, 11 Drawing Sheets

(51) Int. Cl.
*G06F 17/30* (2006.01)
*H04L 29/08* (2006.01)
*H04W 4/20* (2018.01)

(58) Field of Classification Search
USPC .......................................................... 715/739
See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,566,648 B2 | 10/2013 | Schroeder |
| 8,645,376 B2 | 2/2014 | Robinson et al. |
| 8,646,103 B2 | 2/2014 | Jakobson et al. |
| 9,177,007 B2 * | 11/2015 | Winters ............ G06F 17/30345 |
| 9,659,049 B2 * | 5/2017 | Dunn ................ G06F 17/30345 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |

(56) References Cited

U.S. PATENT DOCUMENTS

| | | |
|---|---|---|
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1* | 9/2004 | Catahan, Jr. ............ G06Q 30/06 705/28 |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1* | 12/2004 | Pak .................. G06F 17/30864 704/7 |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1* | 4/2005 | Brodersen .............. G06Q 10/06 705/500 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshaysky et al. |
| 2011/0247051 A1 | 10/2011 | Bulumulla et al. |
| 2012/0010995 A1* | 1/2012 | Skirpa .................. G06F 3/0481 705/14.49 |
| 2012/0042218 A1 | 2/2012 | Cinarkaya et al. |
| 2012/0101985 A1* | 4/2012 | Kemp ................ G06F 17/3051 707/609 |
| 2012/0143917 A1* | 6/2012 | Prabaker .......... G06F 17/30165 707/784 |
| 2012/0233137 A1 | 9/2012 | Jakobson et al. |
| 2012/0290407 A1 | 11/2012 | Hubbard et al. |
| 2013/0054517 A1* | 2/2013 | Beechuk .......... G06F 17/30867 707/609 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0101149 A1 | 4/2014 | Winters et al. |
| 2014/0172845 A1* | 6/2014 | Rabe ................ G06F 17/30867 707/728 |
| 2014/0282240 A1* | 9/2014 | Flynn, III ............. G06F 3/0488 715/810 |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0019575 A1 | 1/2015 | Dayon et al. |
| 2015/0032688 A1 | 1/2015 | Dayon et al. |
| 2015/0095162 A1* | 4/2015 | Jakobson .......... G06Q 30/0269 705/14.66 |
| 2015/0142596 A1 | 5/2015 | Jakobson et al. |
| 2015/0172563 A1 | 6/2015 | Jakobson et al. |

OTHER PUBLICATIONS

U.S. Appl. No. 14/317,362, filed Jun. 27, 2014, Dayon et al.
"Google Plus Users", Google+Ripples, Oct. 31, 2011 [retrieved on Feb. 21, 2012 from Internet at http://www.googleplusers.com/google-ripples.html], 3 pages.

* cited by examiner

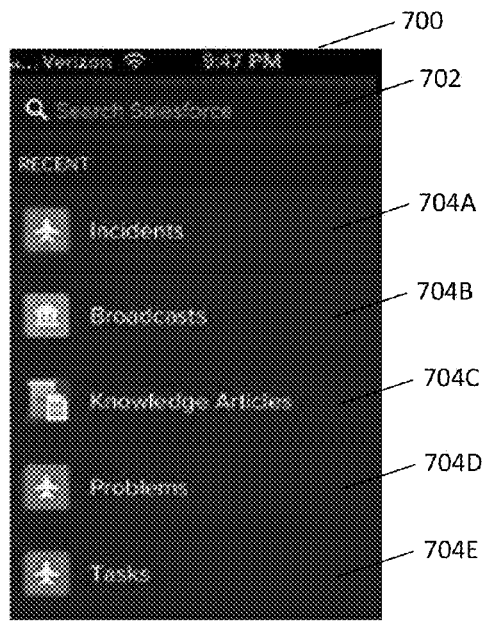
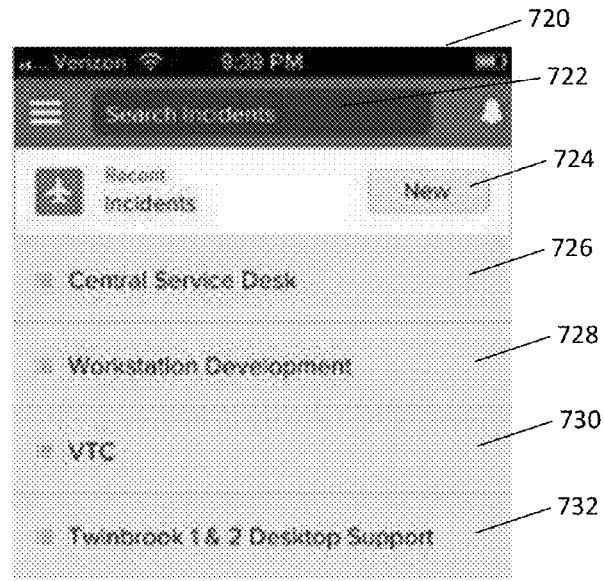
FIGURE 7A
FIGURE 7B
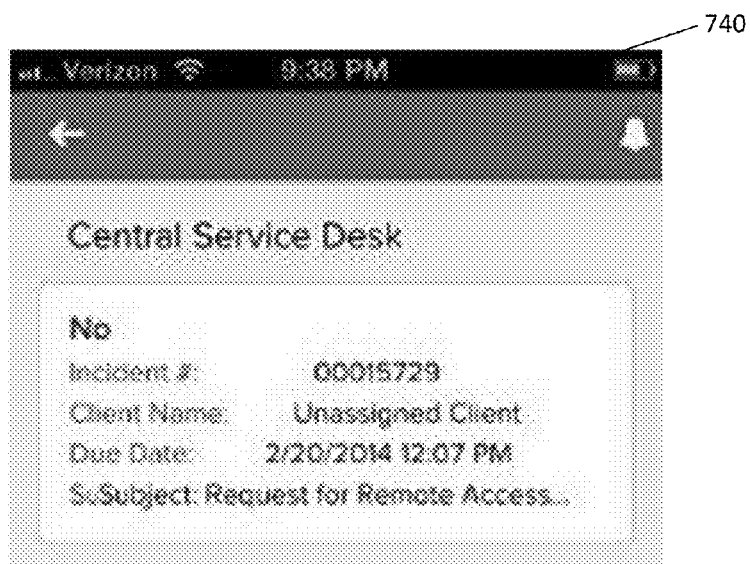
FIGURE 7C

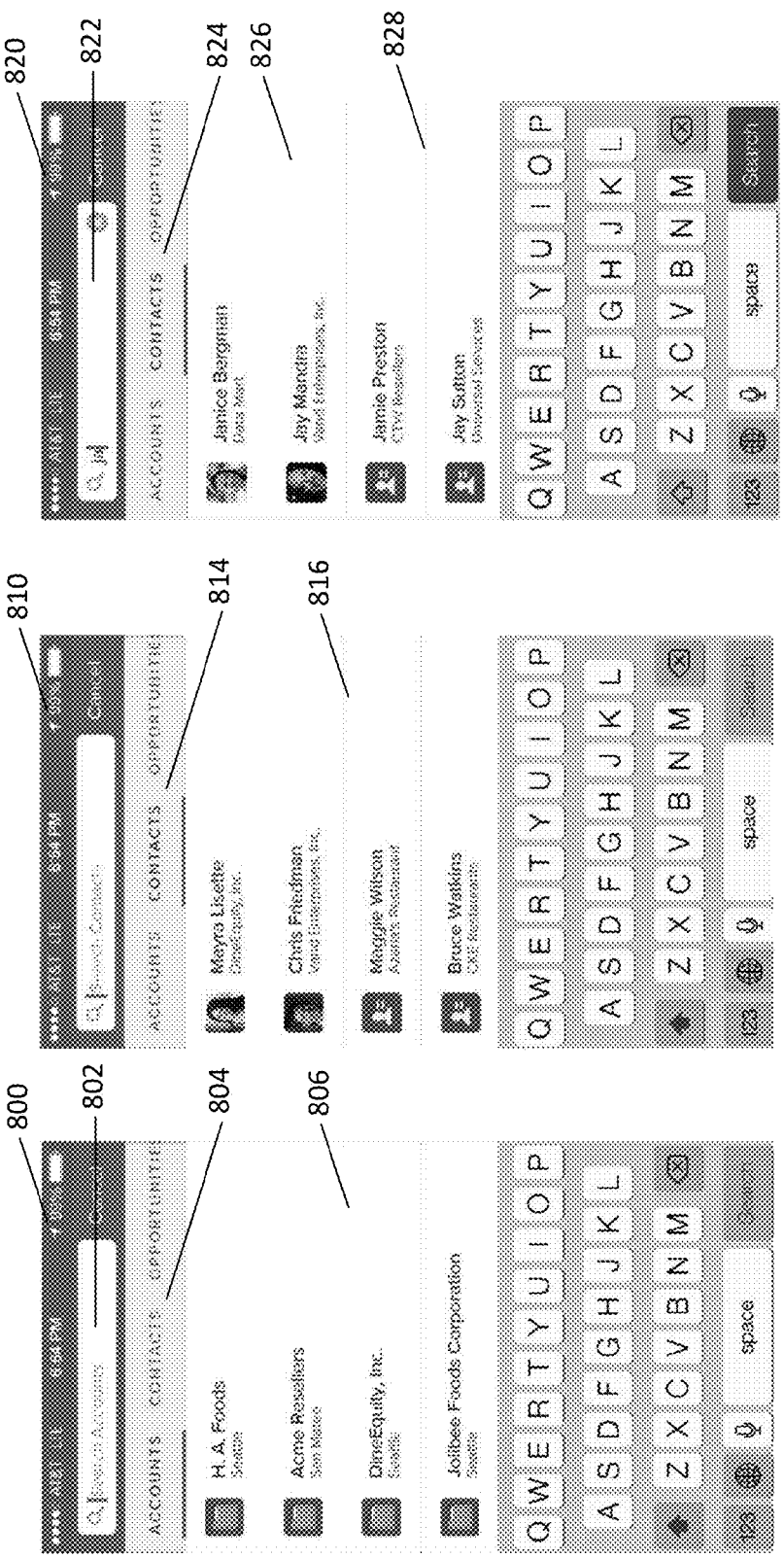

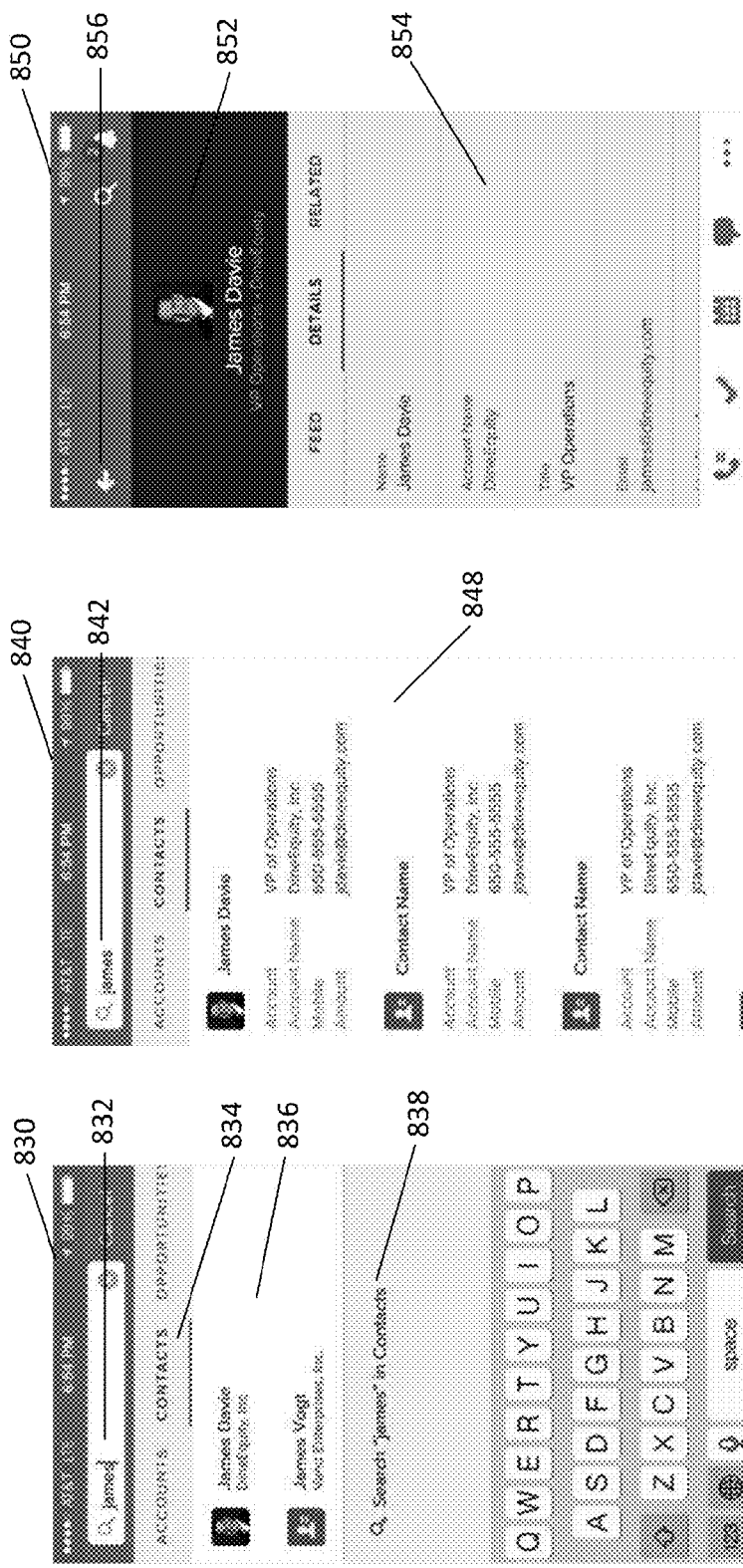

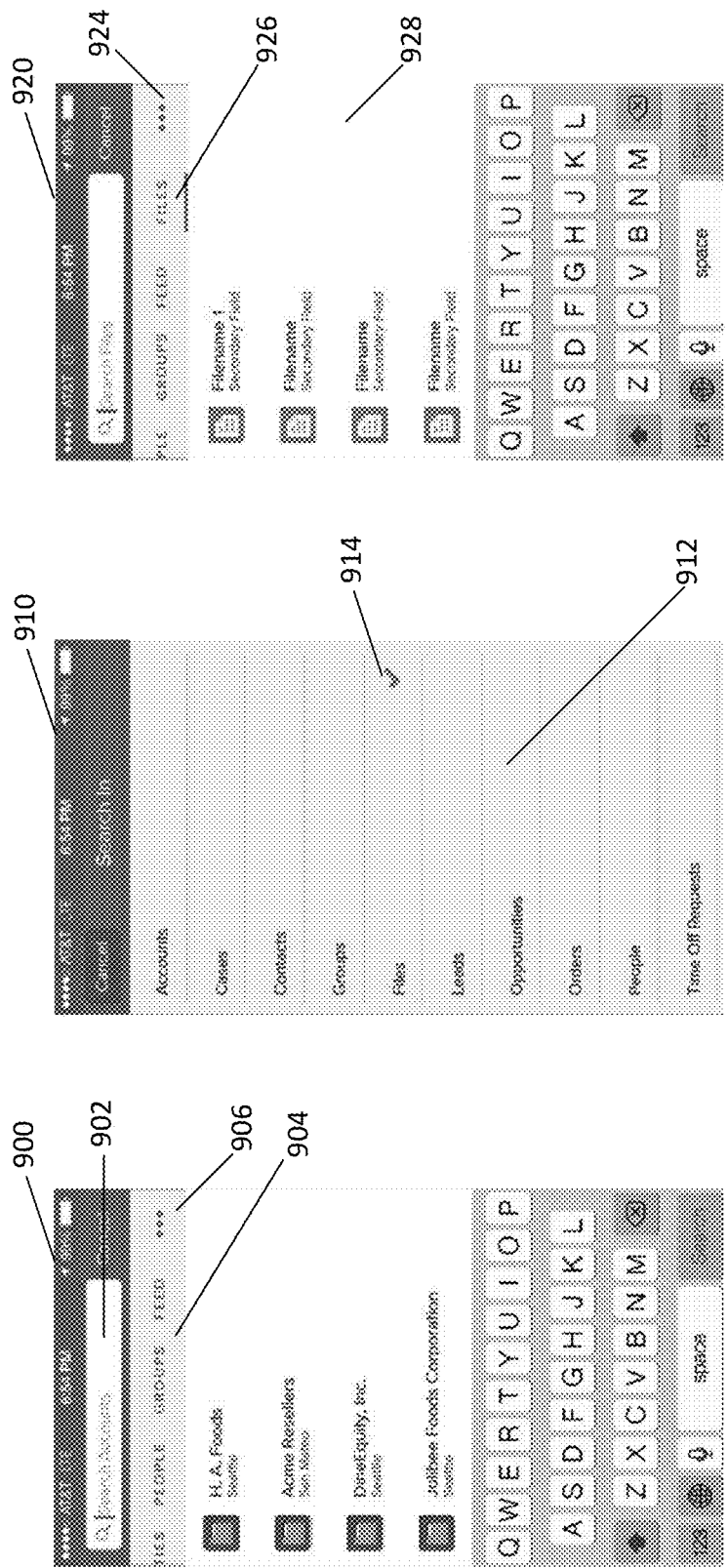

PRESENTING DATA ON A MOBILE DEVICE IN COMMUNICATION WITH AN ON-DEMAND DATABASE SYSTEM

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

PRIORITY DATA

This patent document claims priority to co-pending and commonly assigned U.S. Provisional Patent Application No. 61/866,460, titled "Tools for Providing a Mobile Platform Application to Users of On-Demand Services Environments," by Benioff et al., filed on Aug. 15, 2013, and co-pending and commonly assigned U.S. Provisional Patent Application No. 61/866,474, titled "Providing a Mobile Platform Application to Users of On-Demand Services Environments," by Benioff et al., filed on Aug. 15, 2013, which are hereby incorporated by reference in their entirety and for all purposes.

TECHNICAL FIELD

This patent document relates generally to on-demand services provided over a data network such as the Internet, and more specifically to providing data on a mobile device in communication with an on-demand services environment.

BACKGROUND

Organizations typically employ many different types of software and computing technologies to meet their computing needs. However, installing and maintaining software on an organization's own computer systems may involve one or more drawbacks. For example, when software must be installed on computer systems within the organization, the installation process often requires significant time commitments, since organization personnel may need to separately access each computer. Once installed, the maintenance of such software typically requires significant additional resources. Each installation of the software may need to be separately monitored, upgraded, and/or maintained. Further, organization personnel may need to protect each installed piece of software against viruses and other malevolent code. Given the difficulties in updating and maintaining software installed on many different computer systems, it is common for software to become outdated. Also, the organization will likely need to ensure that the various software programs installed on each computer system are compatible. Compatibility problems are compounded by frequent upgrading, which may result in different versions of the same software being used at different computer systems in the same organization.

Accordingly, organizations increasingly prefer to use on-demand services accessible via the Internet rather than software installed on in-house computer systems. On-demand services, often termed "cloud computing" services, take advantage of increased network speeds and decreased network latency to provide shared resources, software, and information to computers and other devices upon request. Cloud computing typically involves over-the-Internet provision of dynamically scalable and often virtualized resources. Technological details can be abstracted from the users, who no longer have need for expertise in, or control over, the technology infrastructure "in the cloud" that supports them.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

FIGS. 7A-7C show examples of GUIs displaying navigation user interfaces on a mobile device, according to some implementations.

FIGS. 8A-8F show examples of GUIs displaying navigation user interfaces on a mobile device, according to some implementations.

FIGS. 9A-9C show examples of GUIs displaying navigation user interfaces on a mobile device, according to some implementations.

DETAILED DESCRIPTION

Figure 1A:
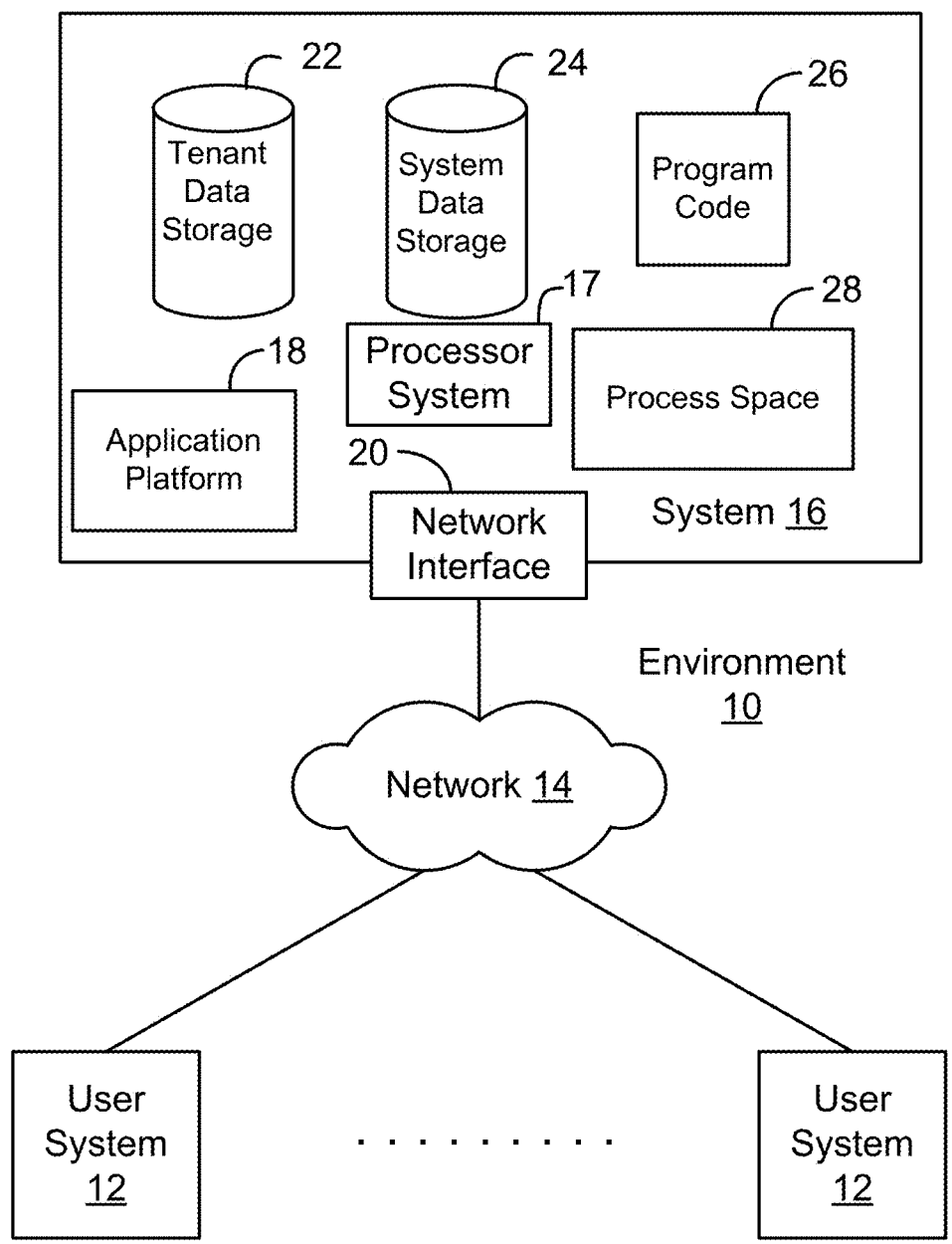
FIG. 1A shows a block diagram of an example of an environment 10 in which an on-demand database service can be used in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations, also referred to herein as "blocks," have not been described in detail in order to avoid unnecessarily obscuring implementations.

Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various implementations described or referenced herein are directed to different methods, apparatus, systems, and computer program products for presenting data on a mobile device in communication with an on-demand database system.

Online social networks are increasingly becoming a common way to facilitate communication among people, any of whom can be recognized as users of a social networking system. One example of a social networking system is Chatter®, provided by salesforce.com, inc. of San Francisco, Calif. salesforce.com, inc. is a provider of social networking services, customer relationship management (CRM) services and other database management services, any of which can be accessed and used in conjunction with the techniques disclosed herein in some implementations. These various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail below.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described below. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, a social networking system may allow a user to follow data objects in the form of records such as cases, accounts, or opportunities, in addition to following individual users and groups of users. The "following" of a record stored in a database, as described in greater detail below, allows a user to track the progress of that record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be user-submitted messages or can otherwise be generated in response to user actions or in response to events. Examples of messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a news feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

Typically, content stored outside of an on-demand database service may be difficult to access from the on-demand database service and may be limited to having to move, replicate, or provide a hyperlink to the content. In addition, access to such content may be limited as various data repositories have different APIs for access and authentication requirements. Furthermore, various content files and folders may be scattered across a plurality of different data sources. Thus, users may be limited in their ability to access, collaborate on, share, modify, comment on, search, view, and otherwise interact with content stored in external data sources in an on-demand database service.

Some on-demand service environments, such as those implementing enterprise social networking systems and other on-demand database systems, provide users with access to various database objects in the form of custom objects, standard Customer Relationship Management (CRM) objects such as accounts, opportunities, leads, cases and contacts, as well as other types of objects such as groups, files, etc. Various users having access to the on-demand service environment may interact with at least some of these objects. For example, in Chatter®, a user may be interested in other users and records being worked on by users. A user accessing a Chatter® feed can view feed items indicating particular changes to the records, notifications of interactions with the records, and user commentary regarding the records and other topics.

With the proliferation of data objects in an on-demand database system, a subset of data objects relevant to and regularly accessed by a user may be relatively small compared to a set of data objects accessible to the user. Moreover, in an increasingly connected world of customers and businesses, where business data is stored in on-demand database systems and is regularly updated, it is desirable to be able to push relevant business data from database servers to appropriate user devices. Traditionally, users primarily interacted with on-demand database systems using their desktop computers. Mobile applications for mobile devices, such as smartphones and tablets, allow users to remain connected to the ever-changing information when they are away from their desktop computers. As an example, the Salesforce1™ mobile application (app) allows a user to access the salesforce.com database system via the user's smartphone or tablet.

In some of the disclosed implementations, a mobile app on a user's mobile device is configured to display to a user of an on-demand database system a list of data objects of the database system that the user recently interacted with using a different device such as the user's desktop computer or laptop computer. For example, the user's previous interactions with various data objects of the database system using a full-featured web service accessible via a browser on the user's desktop may be captured and used to identify particular data objects to display to the user when he later accesses the database system from his mobile device. In some implementations, the user's previous interactions with data objects of the database system using the mobile app on his mobile device or on a different mobile device may also be used to identify data objects to display when he accesses the system from his mobile device. For instance, when a user is traveling with a smartphone and wishes to continue working on a project he previously worked on using his desktop computer or tablet device at his office, it can be helpful to quickly locate CRM objects such as accounts and other data objects that the user was working with when he last accessed the database system.

Some of the disclosed implementations allow a user to customize which data objects will be presented on the user's mobile device. For example, when a user is accessing the database system via a web browser installed on the user's desktop, the user can designate, or "pin," particular data objects to be later presented in a navigation menu of a mobile app viewed on the user's mobile device.

In some implementations, the mobile app may display an initial navigation menu that includes a list of the data objects that the user most recently accessed via a web browser installed on the user's desktop or laptop computer. This may provide the user with quick access to, for example, accounts, contacts, and other objects that he may be most interested in. The list of data objects may also or alternatively identify any data objects which the user "pinned" to the mobile navigation menu when he was viewing the data objects in the web browser. The data objects may be grouped according to object type, such that a single entry in the mobile navigation menu appears for accounts, followed by an entry for contacts, etc. The user may then select one of the entries in the navigation menu to view the recently accessed data objects of that type. For example, when the user selects the Accounts entry, a list of recently accessed accounts is displayed in a GUI on the mobile device.

In some of the disclosed implementations, the user of the mobile app may perform scoped searches of the database system for data objects having a particular type. When the user wishes to perform the scoped search, he may be initially presented with a list of the data object types that he recently or frequently worked with via a web browser installed on the user's desktop or laptop computer. This allows the user to quickly find a data object type, such as an account, a contact, a lead, or an opportunity, that is likely to be relevant to him. If the data object type that he is interested in searching is not initially displayed, he may search for the appropriate object type, and that object type will be displayed when he next requests to perform a scoped search of the database system. Performing a scoped, rather than a global, search may be desirable for improving the efficiency and speed of identifying objects of interest.

These and other implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory (ROM) devices and random access memory (RAM) devices. These and other features of the disclosed implementations will be described in more detail below with reference to the associated drawings.

The term "multi-tenant database system" can refer to those systems in which various elements of hardware and software of a database system may be shared by one or more customers. For example, a given application server may simultaneously process requests for a great number of customers, and a given database table may store rows of data such as feed items for a potentially much greater number of customers. The term "query plan" generally refers to one or more operations used to access information in a database system.

A "user profile" or "user's profile" is generally configured to store and maintain data about a given user of the database system. The data can include general information, such as name, title, phone number, a photo, a biographical summary, and a status, e.g., text describing what the user is currently doing. As mentioned below, the data can include messages created by other users. Where there are multiple tenants, a user is typically associated with a particular tenant. For example, a user could be a salesperson of a company, which is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "information feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different information feeds. A second user following a first user and a record can receive the feed items associated with the first user and the record for display in the second user's news feed, which is another type of information feed. In some implementations, the feed items from any number of followed users and records can be combined into a single information feed of a particular user.

As examples, a feed item can be a message, such as a user-generated post of text data, and a feed tracked update to a record or profile, such as a change to a field of the record. Feed tracked updates are described in greater detail below. A feed can be a combination of messages and feed tracked updates. Messages include text created by a user, and may include other data as well. Examples of messages include posts, user status updates, and comments. Messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a graphical user interface (GUI), for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group. In one implementation, there is only one status for a record.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Messages and feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and messages, such as posts, comments, likes, etc., can define group conversations and change over time.

An "entity feed" or "record feed" generally refers to a feed of feed items about a particular record in the database, such as feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" is a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

I. General Overview

Systems, apparatus, and methods are provided for implementing enterprise level social and business information networking Such implementations can provide more efficient use of a database system. For instance, a user of a database system may not easily know when important information in the database has changed, e.g., about a project or client. Implementations can provide feed tracked updates about such changes and other events, thereby keeping users informed.

By way of example, a user can update a record, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed right to the manager's feed page or other page.

Next, mechanisms and methods for providing systems implementing enterprise level social and business information networking will be described with reference to several implementations. First, an overview of an example of a database system is described, and then examples of tracking events for a record, actions of a user, and messages about a user or record are described. Various implementations about the data structure of feeds, customizing feeds, user selection of records and users to follow, generating feeds, and displaying feeds are also described.

II. System Overview

FIG. 1A shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be implemented as any computing device(s) or other data processing apparatus such as a machine or system that is used by a user to access a database system 16. For example, any of user systems 12 can be a handheld computing device, a mobile phone, a laptop computer, a work station, and/or a network of such computing devices. As illustrated in FIG. 1A (and in more detail in FIG. 1B) user systems 12 might interact via a network 14 with an on-demand database service, which is implemented in the example of FIG. 1A as database system 16.

An on-demand database service, implemented using system 16 by way of example, is a service that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 1A, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 1B:
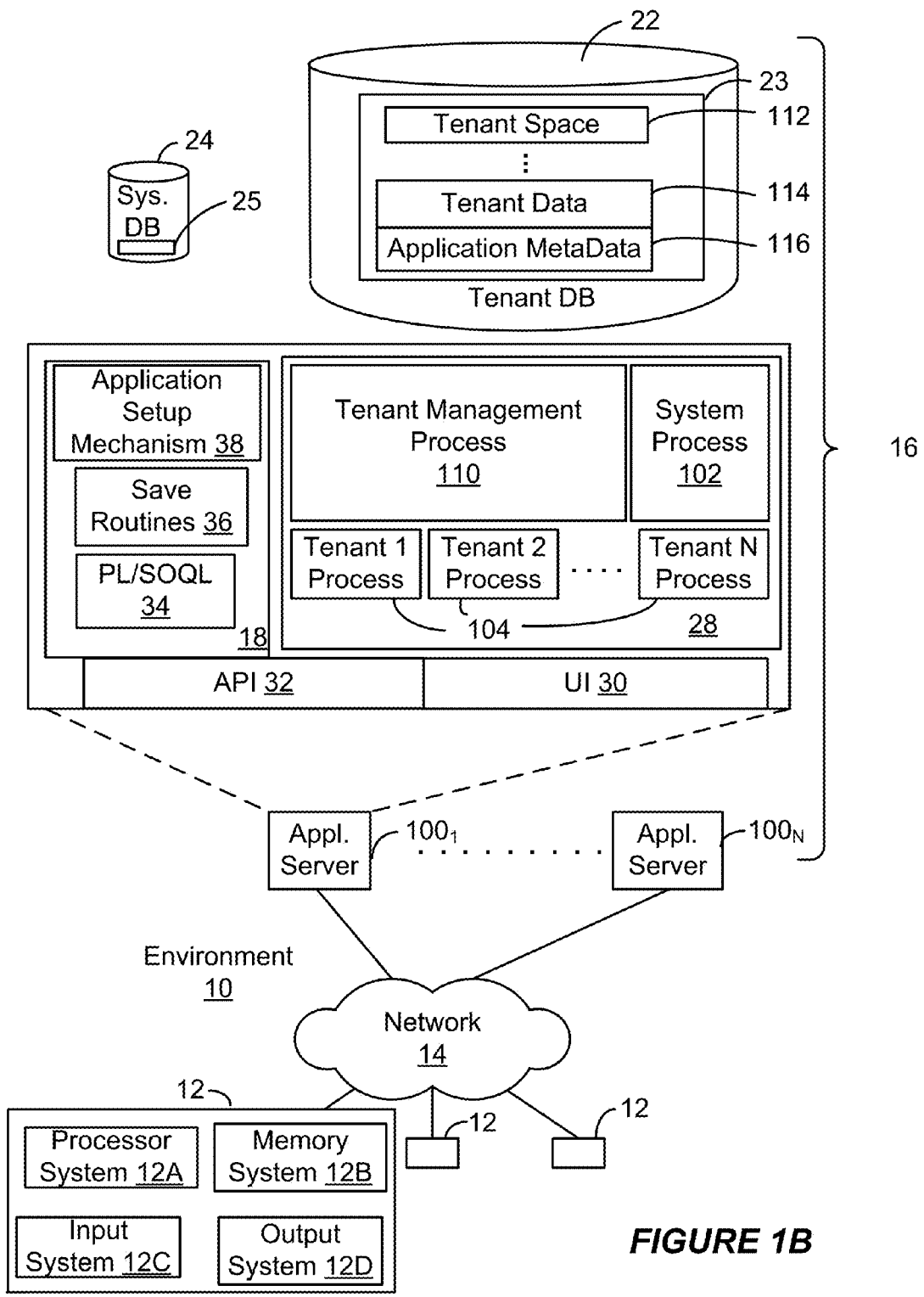
FIG. 1B shows a block diagram of an example of some implementations of elements of FIG. 1A and various possible interconnections between these elements.

One arrangement for elements of system 16 is shown in FIGS. 1A and 1B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 1B shows a block diagram of an example of some implementations of elements of FIG. 1A and various possible interconnections between these elements. That is, FIG. 1B also illustrates environment 10. However, in FIG. 1B elements of system 16 and various interconnections in some implementations are further illustrated. FIG. 1B shows that user system 12 may include processor system 12A, memory system 12B, input system 12C, and output system 12D. FIG. 1B shows network 14 and system 16. FIG. 1B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers 1001-100N, system process space 102, tenant process spaces 104, tenant management process space 110, tenant storage space 112, user storage 114, and application metadata 116. In other implementations, environment 10 may not have the same elements as those listed above and/or may have other elements instead of, or in addition to, those listed above.

User system 12, network 14, system 16, tenant data storage 22, and system data storage 24 were discussed above in FIG. 1A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 1B, system 16 may include a network interface 20 (of FIG. 1A) implemented as a set of HTTP application servers 100, an application platform 18, tenant data storage 22, and system data storage 24. Also shown is system process space 102, including individual tenant process spaces 104 and a tenant management process space 110. Each application server 100 may be configured to communicate with tenant data storage 22 and the tenant data 23 therein, and system data storage 24 and the system data 25 therein to serve requests of user systems 12. The tenant data 23 might be divided into individual tenant storage spaces 112, which can be either a physical arrangement and/or a logical arrangement of data. Within each tenant storage space 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage space 112. A UI 30 provides a user interface and an API 32 provides an application programmer interface to system 16 resident processes to users and/or developers at user systems 12. The tenant data and the system data may be stored in various databases, such as one or more Oracle|databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server 1001 might be coupled via the network 14 (e.g., the Internet), another application server 100N-1 might be coupled via a direct network link, and another application server 100N might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain implementations, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one implementation, therefore, an interface system implementing a load balancing function (e.g., an F5 Big-IP load balancer) is communicably coupled between the application servers 100 and the user systems 12 to distribute requests to the application servers 100. In one implementation, the load balancer uses a least connections algorithm to route user requests to the application servers 100. Other examples of load balancing algorithms, such as round robin and observed response time, also can be used. For example, in certain implementations, three consecutive requests from the same user could hit three different application servers 100, and three requests from different users could hit the same application server 100. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 100 to request and update system-level and tenant-level data from system 16 that may involve sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
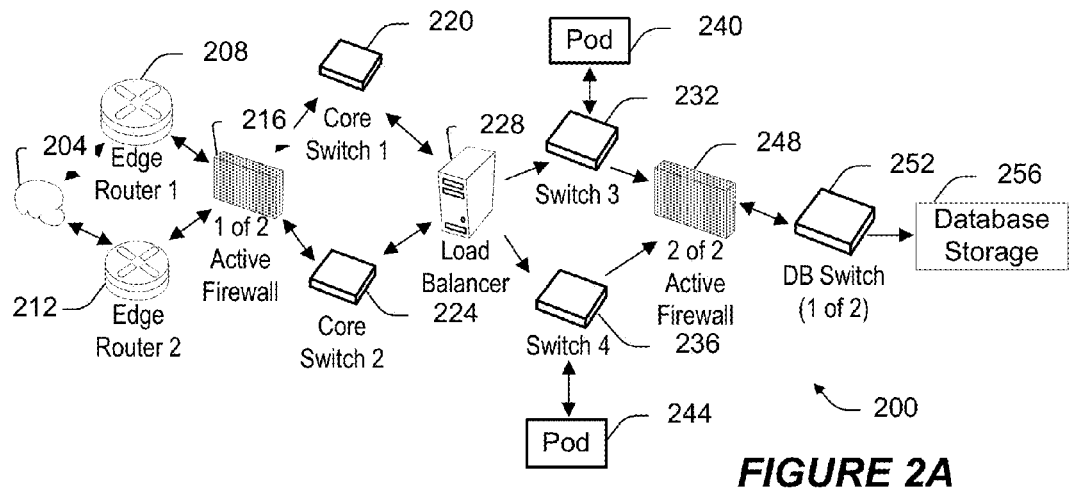
FIG. 2A shows a system diagram illustrating an example of architectural components of an on-demand database service environment 200 according to some implementations.

FIG. 2A shows a system diagram illustrating an example of architectural components of an on-demand database service environment 200 according to some implementations. A client machine located in the cloud 204, generally referring to one or more networks in combination, as described herein, may communicate with the on-demand database service environment via one or more edge routers 208 and 212. A client machine can be any of the examples of user systems 12 described above. The edge routers may communicate with one or more core switches 220 and 224 via firewall 216. The core switches may communicate with a load balancer 228, which may distribute server load over different pods, such as the pods 240 and 244. The pods 240 and 244, which may each include one or more servers and/or other computing resources, may perform data processing and other operations used to provide on-demand services. Communication with the pods may be conducted via pod switches 232 and 236. Components of the on-demand database service environment may communicate with a database storage 256 via a database firewall 248 and a database switch 252.

Figure 2B:
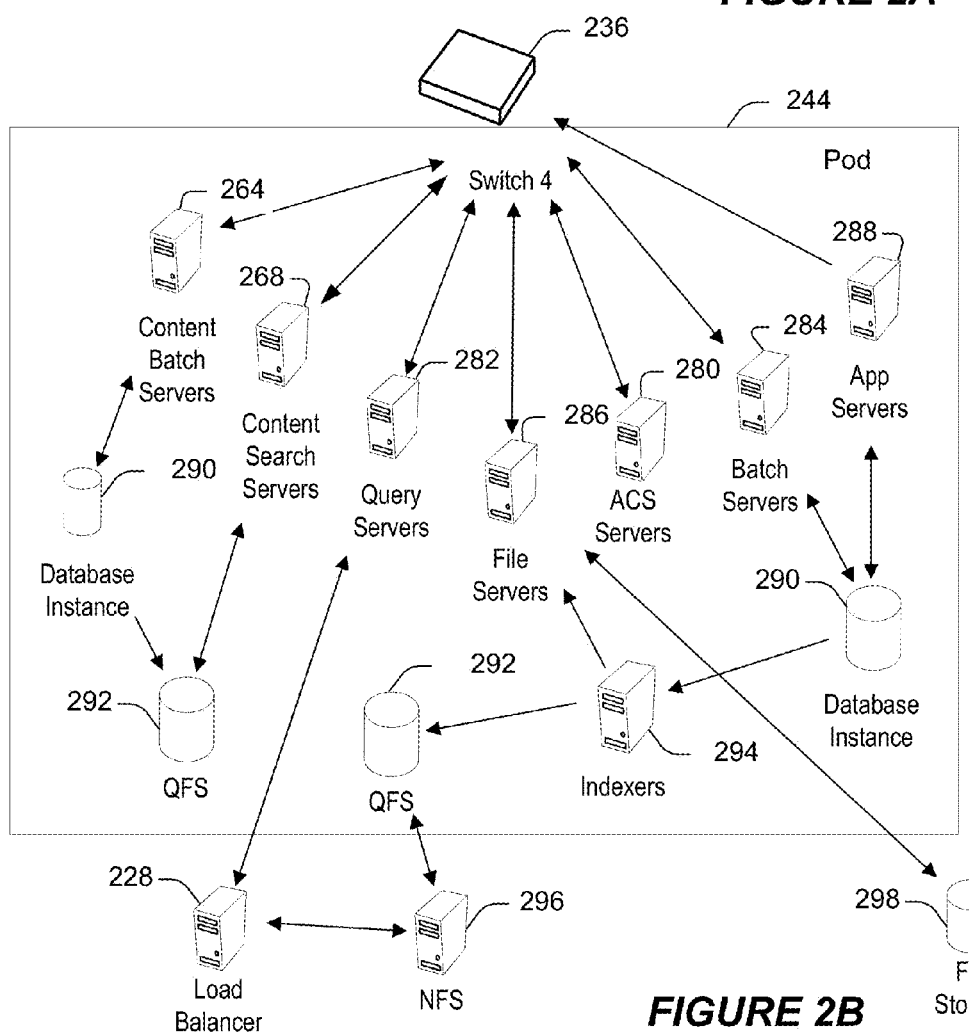
FIG. 2B shows a system diagram further illustrating an example of architectural components of an on-demand database service environment according to some implementations.

As shown in FIGS. 2A and 2B, accessing an on-demand database service environment may involve communications transmitted among a variety of different hardware and/or software components. Further, the on-demand database service environment 200 is a simplified representation of an actual on-demand database service environment. For example, while only one or two devices of each type are shown in FIGS. 2A and 2B, some implementations of an on-demand database service environment may include anywhere from one to many devices of each type. Also, the on-demand database service environment need not include each device shown in FIGS. 2A and 2B, or may include additional devices not shown in FIGS. 2A and 2B.

Moreover, one or more of the devices in the on-demand database service environment 200 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 204 is intended to refer to a data network or plurality of data networks, often including the Internet. Client machines located in the cloud 204 may communicate with the on-demand database service environment to access services provided by the on-demand database service environment. For example, client machines may access the on-demand database service environment to retrieve, store, edit, and/or process information.

In some implementations, the edge routers 208 and 212 route packets between the cloud 204 and other components of the on-demand database service environment 200. The edge routers 208 and 212 may employ the Border Gateway Protocol (BGP). The BGP is the core routing protocol of the Internet. The edge routers 208 and 212 may maintain a table of IP networks or 'prefixes', which designate network reachability among autonomous systems on the Internet.

In one or more implementations, the firewall 216 may protect the inner components of the on-demand database service environment 200 from Internet traffic. The firewall 216 may block, permit, or deny access to the inner components of the on-demand database service environment 200 based upon a set of rules and other criteria. The firewall 216 may act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 may be configured as network bridges that quickly route data between different components within the on-demand database service environment. In some implementations, the use of two or more core switches 220 and 224 may provide redundancy and/or reduced latency.

In some implementations, the pods 240 and 244 may perform the core data processing and service functions provided by the on-demand database service environment. Each pod may include various types of hardware and/or software computing resources. An example of the pod architecture is discussed in greater detail with reference to FIG. 2B.

In some implementations, communication between the pods 240 and 244 may be conducted via the pod switches 232 and 236. The pod switches 232 and 236 may facilitate communication between the pods 240 and 244 and client machines located in the cloud 204, for example via core switches 220 and 224. Also, the pod switches 232 and 236 may facilitate communication between the pods 240 and 244 and the database storage 256.

In some implementations, the load balancer 228 may distribute workload between the pods 240 and 244. Balancing the on-demand service requests between the pods may assist in improving the use of resources, increasing throughput, reducing response times, and/or reducing overhead. The load balancer 228 may include multilayer switches to analyze and forward traffic.

In some implementations, access to the database storage 256 may be guarded by a database firewall 248. The database firewall 248 may act as a computer application firewall operating at the database application layer of a protocol stack. The database firewall 248 may protect the database storage 256 from application attacks such as structure query language (SQL) injection, database rootkits, and unauthorized information disclosure.

In some implementations, the database firewall 248 may include a host using one or more forms of reverse proxy services to proxy traffic before passing it to a gateway router. The database firewall 248 may inspect the contents of database traffic and block certain content or database requests. The database firewall 248 may work on the SQL application level atop the TCP/IP stack, managing applications' connection to the database or SQL management interfaces as well as intercepting and enforcing packets traveling to or from a database network or application interface.

In some implementations, communication with the database storage 256 may be conducted via the database switch 252. The multi-tenant database storage 256 may include more than one hardware and/or software components for handling database queries. Accordingly, the database switch 252 may direct database queries transmitted by other components of the on-demand database service environment (e.g., the pods 240 and 244) to the correct components within the database storage 256.

In some implementations, the database storage 256 is an on-demand database system shared by many different organizations. The on-demand database system may employ a multi-tenant approach, a virtualized approach, or any other type of database approach. An on-demand database system is discussed in greater detail with reference to FIGS. 1A and 1B.

FIG. 2B shows a system diagram further illustrating an example of architectural components of an on-demand database service environment according to some implementations. The pod 244 may be used to render services to a user of the on-demand database service environment 200. In some implementations, each pod may include a variety of servers and/or other systems. The pod 244 includes one or more content batch servers 264, content search servers 268, query servers 282, file servers 286, access control system (ACS) servers 280, batch servers 284, and app servers 288. Also, the pod 244 includes database instances 290, quick file systems (QFS) 292, and indexers 294. In one or more implementations, some or all communication between the servers in the pod 244 may be transmitted via the switch 236.

In some implementations, the app servers 288 may include a hardware and/or software framework dedicated to the execution of procedures (e.g., programs, routines, scripts) for supporting the construction of applications provided by the on-demand database service environment 200 via the pod 244. In some implementations, the hardware and/or software framework of an app server 288 is configured to execute operations of the services described herein, including performance of the blocks of methods described with reference to FIGS. 3-9C. In alternative implementations, two or more app servers 288 may be included and cooperate to perform such methods, or one or more other servers described herein can be configured to perform the disclosed methods.

The content batch servers 264 may handle requests internal to the pod. These requests may be long-running and/or not tied to a particular customer. For example, the content batch servers 264 may handle requests related to log mining, cleanup work, and maintenance tasks.

The content search servers 268 may provide query and indexer functions. For example, the functions provided by the content search servers 268 may allow users to search through content stored in the on-demand database service environment.

The file servers 286 may manage requests for information stored in the File storage 298. The File storage 298 may store information such as documents, images, and basic large objects (BLOBs). By managing requests for information using the file servers 286, the image footprint on the database may be reduced.

The query servers 282 may be used to retrieve information from one or more file systems. For example, the query system 282 may receive requests for information from the app servers 288 and then transmit information queries to the NFS 296 located outside the pod.

The pod 244 may share a database instance 290 configured as a multi-tenant environment in which different organizations share access to the same database. Additionally, services rendered by the pod 244 may call upon various hardware and/or software resources. In some implementations, the ACS servers 280 may control access to data, hardware resources, or software resources.

In some implementations, the batch servers 284 may process batch jobs, which are used to run tasks at specified times. Thus, the batch servers 284 may transmit instructions to other servers, such as the app servers 288, to trigger the batch jobs.

In some implementations, the QFS 292 may be an open source file system available from Sun Microsystems® of Santa Clara, Calif. The QFS may serve as a rapid-access file system for storing and accessing information available within the pod 244. The QFS 292 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 268 and/or indexers 294 to identify, retrieve, move, and/or update data stored in the network file systems 296 and/or other storage systems.

In some implementations, one or more query servers 282 may communicate with the NFS 296 to retrieve and/or update information stored outside of the pod 244. The NFS 296 may allow servers located in the pod 244 to access information to access files over a network in a manner similar to how local storage is accessed.

In some implementations, queries from the query servers 222 may be transmitted to the NFS 296 via the load balancer 228, which may distribute resource requests over various resources available in the on-demand database service environment. The NFS 296 may also communicate with the QFS 292 to update the information stored on the NFS 296 and/or to provide information to the QFS 292 for use by servers located within the pod 244.

In some implementations, the pod may include one or more database instances 290. The database instance 290 may transmit information to the QFS 292. When information is transmitted to the QFS, it may be available for use by servers within the pod 244 without using an additional database call.

In some implementations, database information may be transmitted to the indexer 294. Indexer 294 may provide an index of information available in the database 290 and/or QFS 292. The index information may be provided to file servers 286 and/or the QFS 292.

Figure 3:
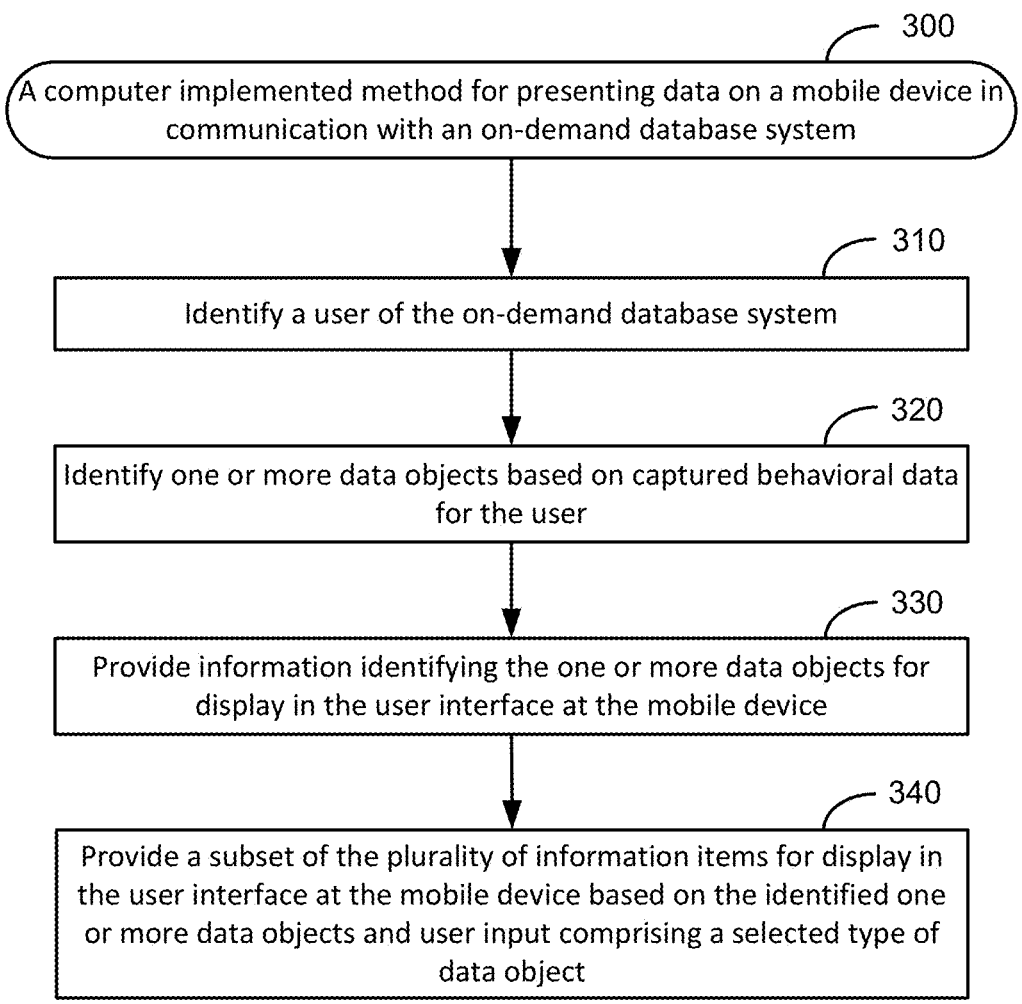
FIG. 3 shows a flowchart of an example of a computer implemented method 300 for presenting data on a mobile device in communication with an on-demand database system, according to some implementations.

III. Presenting Data on a Mobile Device in Communication with an On-Demand Database System FIG. 3 shows a flowchart of an example of a computer implemented method 300 for presenting data on a mobile device in communication with an on-demand database system, according to some implementations. The method 300 can be performed by or using any suitable computing device, computing system or any number of computing devices or systems that may cooperate to perform the method 300. In some implementations, each of the blocks of the method 300 can be performed wholly or partially by or using the database system 16 of FIGS. 1A and 1B, or other suitable devices or components (including processors) described herein, or the like.

In FIG. 3, at block 310, a computing device of an on-demand database system identifies a user associated with a mobile device having a mobile app installed on the device. The mobile device may be a smartphone, a tablet, a wearable device, or a personal digital assistant, by way of example only. The mobile device includes a display configured to display user interfaces including navigation menus and other selections.

As an example, the user may log in to the on-demand database system via a full-featured web service accessible via a browser on the user's desktop computer or via a mobile app on the user's mobile device. As a non-limiting example, the Salesforce1™ mobile app may allow a user of the salesforce.com database system to log in to the system using a mobile device. As mentioned above, the user may perform most of his interactions with the database system via a web browser of his desktop computer or laptop computer. However, being able to access the system via a mobile app on his smartphone or tablet may allow the user to conveniently check on updates to accounts or groups that the user is following in the database system, to write a post, to upload a file, or perform other interactions with the database system. In some implementations, it is helpful for the user to be able to see the accounts or other records that he most recently interacted with via the web browser.

Figure 6:
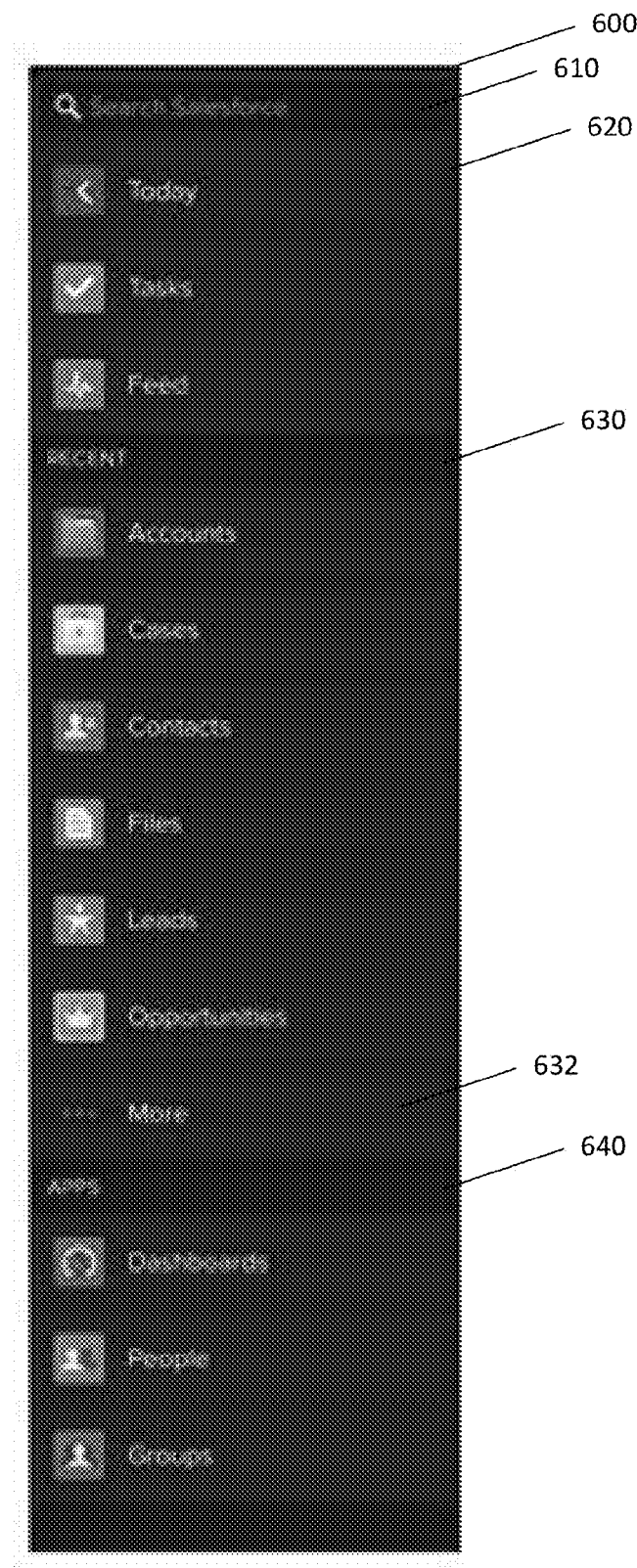
FIG. 6 shows an example of a graphical user interface (GUI) displaying a navigation menu 600 of a mobile user interface, according to some implementations.

FIG. 6 shows an example of a graphical user interface (GUI) displaying a navigation menu 600 of a mobile user interface, according to some implementations. In some implementations, the navigation menu 600 is displayed by a mobile app running on a user's mobile device. In some other implementations, the navigation menu 600 is displayed by a web app running on the mobile device. The navigation menu 600 provides the user with quick access to relevant data. The navigation menu 600 includes a search bar 610, allowing the user to search the on-demand database system for a particular record, such as the name of an account or opportunity.

The navigation menu 600 also includes one or more menu items 620 including "Today", "Tasks" and "Feed", which may be customized by the user or by an administrator of the database system. The navigation menu 600 also includes an "Apps" section 640, which contains items that the user or an administrator has customized to include in the navigation menu. The items in sections 620 and 640 may include items that, when selected, navigate the mobile app to a feed, or a task list, or a dashboard, or a custom page of the on-demand database system.

The navigation menu 600 further includes a "Recent" section 630, which includes a list of types of searchable objects that the user has viewed or worked with recently using a web browser on the user's desktop or laptop. The on-demand database system may track which objects the user accesses and interacts with and identify these objects or the types of these objects in the navigation menu 600 of the mobile app. In this example, the types of objects that the user has most recently interacted with are accounts, cases, contacts, files, leads and opportunities. In some implementations, other types of objects, including user-generated objects, or custom objects, may be displayed here. In some implementations, these types of objects may be listed in the navigation menu in order of how recently an object of that type was accessed. Alternatively, particular objects can be listed in this section 630 in order of the most frequently accessed objects within the last 24 hours or some other user-customized timeframe. In some other implementations, objects or types of objects may be presented in alphabetical order. In some implementations, if the user does not yet have a history of recent objects, a default set of objects or types of objects may be displayed in the "Recent" section. If a user is looking for an object or type of object not listed in the "Recent" section 630, the user may also select the "More" menu item 632 to view a full list of all searchable objects in the on-demand database system.

FIGS. 7A-7C show examples of GUIs displaying navigation user interfaces on a mobile device, according to some implementations. A navigation user interface 700 of FIG. 7A includes a search box 702 and "Smart Search" menu items for incidents 704A, broadcasts 704B, knowledge articles 704C, problems 704D and tasks 704E. Each "Smart Search" item is a data object type, and selecting the "Smart Search" item causes a search interface to be displayed, allowing the user to search for data objects having the selected data object type. For example, selecting the incidents menu item 704A will open up an interface for viewing recently accessed incident data objects and for searching for a particular incident data object.

FIG. 7B shows an example of such a search interface 720. The search interface 720 includes a search box 722 for a user to enter search terms to use in searching for incidents in the system. The search interface 720 also includes a New button 724 for creating a new incident. As an example, a user might want to create a new incident after searching the system for a particular incident and finding that the incident does not yet exist in the system.

The search interface 720 also includes one or more information items 726, 728, 730 and 732 that present data object information. In this example, the items 726-732 provide the names of incidents in the system. In some implementations, the information items may provide additional information about the data object, such as a timestamp or serial number. In this example, the items 726-732 in the search interface 720 are incidents most recently and/or most frequently accessed by the user. If the user does not find the incident he is interested in among the items 726-732, he can enter a search term in the search box 722 to search the database system for a particular incident.

Selecting one of the information items, such as the "Central Service Desk" listview item 726, may cause the item to be displayed in a listview user interface 740, as illustrated in FIG. 7C. The listview may include a query or filter including criteria for identifying incident objects to display in the listview. The listview user interface 740 may provide the user with additional data stored in association with incident objects that meet the criteria of the Central Service Desk listview. The user or an administrator of the system may customize which attributes to include in the listview user interface 740, such that the most relevant information for the incident is generally provided to the user.

Returning to FIG. 3, at block 320, one or more data objects, such as CRM objects stored in the on-demand database system, are identified. The data object(s) may be identified based on captured behavioral data for the user, for instance, regarding the user's previous interactions with the data object(s) from another computing device.

By way of example, the captured behavioral data for a user may identify particular interactions, types of interactions, frequency of interactions, lengths of time of interactions, and other behavioral characteristics that a user exhibits when interacting with particular data objects in the on-demand database system. Behavioral data can indicate characteristics of actions such as a user accessing a data object, updating an attribute of a data object, creating a new data object, searching for a data object, or working with a workflow associated with a data object.

In some implementations, the captured behavioral data includes only interactions by the user with the on-demand database system via a web application displayed in a web browser of a computer. In some implementations, the captured data does not include interactions with data objects of the database system via the mobile app running on the user's mobile device. In other implementations, the captured behavioral data may include both interactions with the database system via the browser web application and interactions via the mobile app of the mobile device.

In some implementations, the captured behavioral data may also include a previous request by the user to "pin" a data object to the "Recent" section of the navigation menu 600 of FIG. 6. In some implementations, the user's act of "pinning" the data object may cause the data object to be displayed above some other data objects that have been accessed more recently or more frequently than the "pinned" data object.

In FIG. 3, at block 330, the identified data object(s) are provided for display in the user interface of the mobile device. The data objects can be categorized in the user interface according to their data object types. Returning to the example of FIG. 7A, data objects may be displayed in the navigation user interface 700 according to their type, such that an incidents menu item 704A represents the one or more incidents that were identified in the system. Selecting the incidents menu item 704A causes a list of the identified incidents to be displayed as described above with reference to FIG. 7B.

In FIG. 3, at block 340, a subset of the information items is provided for display in the user interface of the mobile device. The subset of information items is identified based on a user input selecting an object type. By way of example, returning to FIG. 7A, when the user selects the incidents menu item 704A to indicate that he wishes to search or view recently accessed incidents, the search interface 720 of FIG. 7B is presented as described above.

Figure 4:
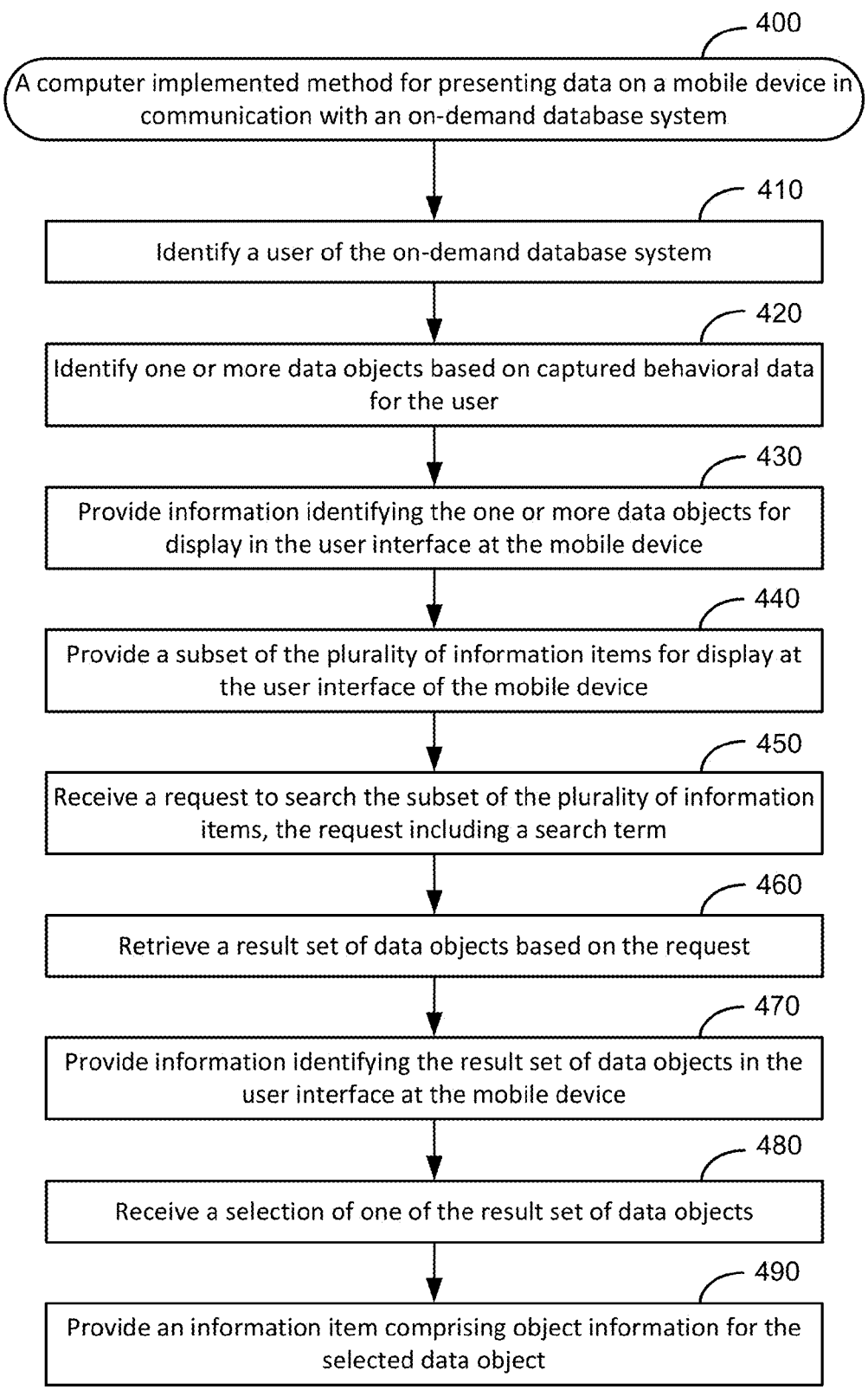
FIG. 4 shows a flowchart of an example of a computer implemented method 400 for presenting data on a mobile device in communication with an on-demand database system, according to some implementations.

FIG. 4 shows a flowchart of an example of a computer implemented method 400 for presenting recently accessed data on a mobile device in communication with an on-demand database system, according to some implementations. The method 400 can be performed by or using any suitable computing device, computing system or any number of computing devices or systems that may cooperate to perform the method 400. In some implementations, each of the blocks of the method 400 can be performed wholly or partially by or using the database system 16 of FIGS. 1A and 1B, or other suitable devices or components (including processors) described herein, or the like.

In FIG. 4, blocks 410, 420, 430, and 440 are performed in the same or similar fashion as blocks 310, 320, 330 and 340 of FIG. 3 as explained above. In FIG. 4, at block 450, a request to search the subset of information items is received. The request includes a search term. For example, when the user is presented with the search interface 720 of FIG. 7B, the data object that the user is looking for may not be displayed in the information items of the search interface. At block 450 of FIG. 4, the user may then submit a request to search for a data object by providing a search term and/or a data object type. At block 460, the computing device or devices performing method 400 retrieve(s) a result set of data objects based on the request. Each data object in the result set may include the search term in the name of the data object and be of the selected type identified by the request.

FIGS. 8A-8F show examples of GUIs displaying navigation user interfaces on a mobile device, according to some implementations. FIG. 8A shows an example of a search interface 800 that includes a search box 802 and a smart scope menu 804 that identifies one or more types of searchable data objects of the on-demand database system. The smart scope menu 804 allows the user to scope his search to a particular data object type, such as accounts, contacts, or opportunities. If a user wishes to search for a contact, he can select "contacts" in the smart scope menu 804, and the search results will include contacts that match a search term provided by the user in the search box 802. In the example of FIG. 8A, "ACCOUNTS" is initially selected in the smart scope menu 804. The search interface 800 further includes items 806 that identify recently accessed data objects having the type identified in the smart scope menu 804. In FIG. 8A, the displayed items 806 include the particular accounts: "H.A. Foods," "Acme Resellers," "DineEquity, Inc.," and "Jolibee Foods Corporation." In this example, these accounts may be the accounts that the user most recently accessed when previously navigating the on-demand database system using his desktop computer or mobile device.

FIG. 8B shows an example where the user selects "CONTACTS" from a smart scope menu 814. The user's selection triggers a request to display the items containing information for recently accessed contacts in the on-demand database system. As such, the items 816 displayed in the search interface 810 include information for four contacts: "Mayra Lisette," "Chris Friedman," "Maggie Wilson," and "Bruce Watkins." These four contacts may be the contacts the user most recently viewed.

FIG. 8C shows an example where the user types the search term "ja" into a search box 822 of a search interface 820. Thus, the request includes the search term "ja", and the smart scope menu indicates that the contacts data object type 824 has been selected. As such, the retrieved set of data objects includes contacts that have names that include the search term "ja." In some implementations, the retrieved set of data objects may include data objects that were previously identified based on the user's captured behavioral data, as well as data objects of the on-demand database system that were not previously identified as recently accessed by the user. For example, in FIG. 8C, the first two items 826 identify contacts that were previously identified, and the second two items 828 identify contacts of the on-demand database system that were not part of the previously identified set.

Returning to FIG. 4, at block 470, the computing device performing method 400 provides the result set of data objects for display in the user interface of the mobile device. In some implementations, only part of the result set of data objects is displayed in the user interface. FIG. 8D shows an example where the user has selected "CONTACTS" from a smart scope menu 834 and performed a search for the string "james" in a search box 832. As a result of the search, two contacts 836 are identified and displayed in a search interface 830, "James Davie" and "James Vogt."

In FIG. 8D, the search interface 830 also includes a search option 838 to perform a full search for the search term within attributes of the contact data objects of the on-demand database system. As an example, the initial search may have been a search on the names of the contacts in the system. The full search allows a user to search the attributes of the contact data objects for the search term. In some cases, where a user is looking for a particular contact, but is not able to find the contact using only the contact name, the user may utilize the search option 838 to search the attributes of the contact data objects as well. In some implementations, a subset of the contact data object's attributes may be designated by the user or an administrator of the database system, so that the search may be performed more efficiently or to ensure that relevant attributes are being searched.

FIG. 8E shows an example of search results 848 for a full search for the search term "james" in a search box 842 in the attributes of the contacts data objects of the database system. The search results 848 are displayed in the search interface 840 in items containing additional information for each of the contacts.

Returning to FIG. 4, at block 480, a selection of one of the result set of data objects displayed in the user interface is received. Returning to FIG. 8D by way of example, the user may select one of the two contacts 836 displayed in the search interface 830 in order to view details for that contact.

In FIG. 4, at block 490, an information item containing object information for the selected data object is provided for display. Returning to FIG. 8D, for example, when the user selects the first displayed contact, "James Davie," the user may be presented with an object detail interface 850 of FIG. 8F. The object detail interface 850 includes some basic attributes 852 of the selected contact, such as the name, position, and company name for the contact. An administrator of the database system may customize the basic attributes that are presented at the top of the object detail interface. Pressing on a back button 856 will return to the search results interface.

Figure 5:
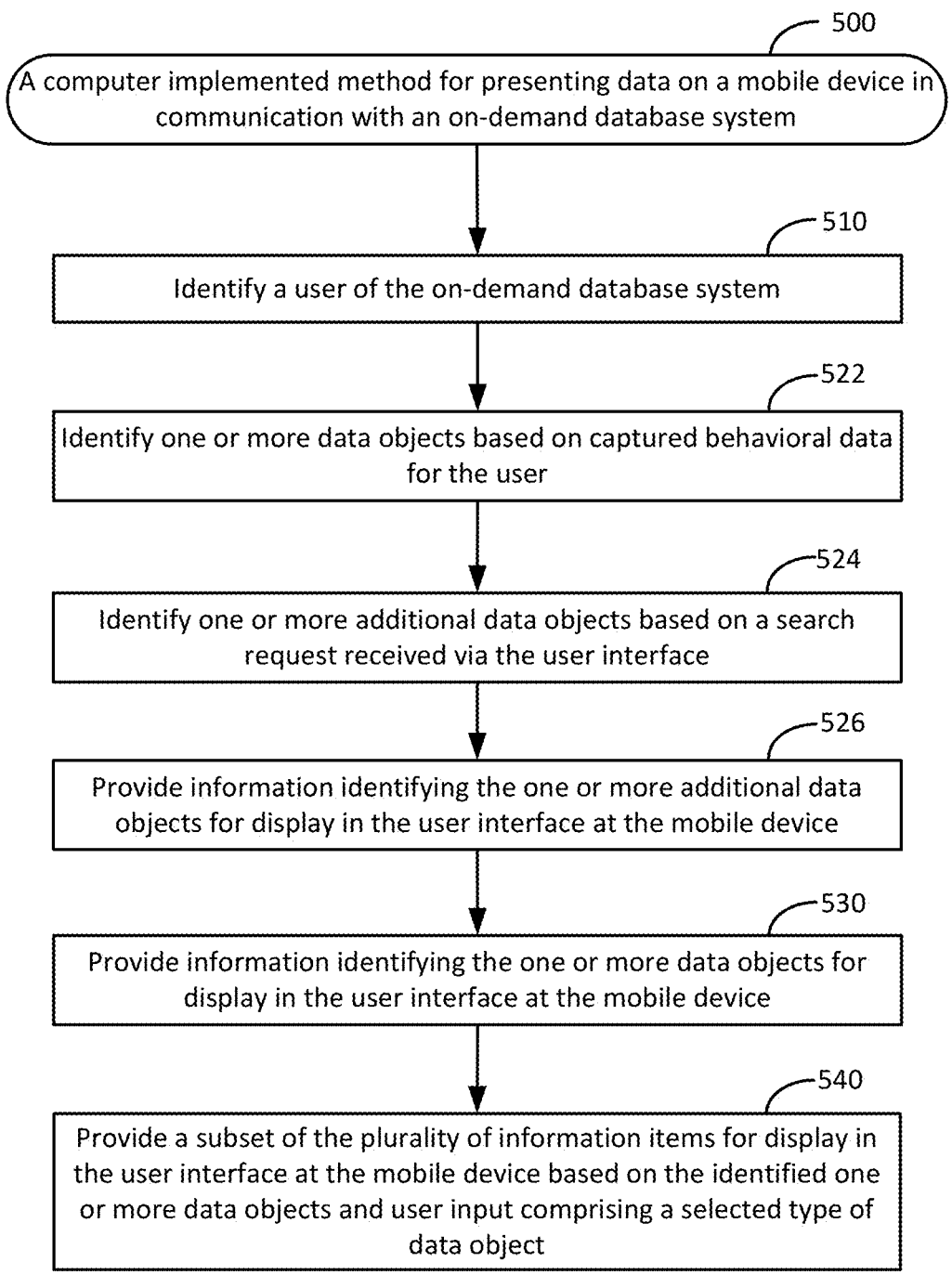
FIG. 5 shows a flowchart of an example of a computer implemented method 500 for presenting data on a mobile device in communication with an on-demand database system, according to some implementations.

FIG. 5 shows a flowchart of an example of a computer implemented method 500 for presenting data on a mobile device in communication with an on-demand database system, according to some implementations. The method 500 can be performed by or using any suitable computing device, computing system or any number of computing devices or systems that may cooperate to perform the method 500. In some implementations, each of the blocks of the method 500 can be performed wholly or partially by or using the database system 16 of FIGS. 1A and 1B, or other suitable devices or components (including processors) described herein, or the like.

In FIG. 5, blocks 510, 522, 530 and 540 are performed in the same or similar fashion as blocks 310, 320, 330 and 340 of FIG. 3 as explained above. In FIG. 5, at block 524, one or more additional data objects are identified based on a search request. FIGS. 9A-9C show examples of GUIs displaying navigation user interfaces on a mobile device, according to some implementations. FIG. 9A shows an example of a search interface 900 that includes a search box 902 and a smart scope menu 904. In the event that a user wishes to search for a data object that is not identified in the smart scope menu 904, the user may swipe to the end of the smart scope menu 904 and press on an overflow button 906 to display additional searchable data object types.

FIG. 9B shows an example of an interface 910 that may be displayed to a user to prompt a selection of a data object type to be searched. The interface 910 displays one or more searchable data object types 912 for the user to choose from. In this example, the user selects Files 914, identifying the set of Files data objects in the database system as the additional data objects to search.

Returning to FIG. 5, at block 526, one or more additional objects are provided for inclusion in the user interface of the mobile device. By way of example, in FIG. 9C, a search interface 920 may be displayed in response to a user selecting Files in the interface 910 of FIG. 9B. The search interface 920 includes a smart scope menu 924 that now includes "Files" as an option 926 along with the original smart scope menu items. The search interface 920 also displays the most recently accessed files 928 in the on-demand database system based on the user's previous interactions with one or more files in the system.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand database service environment is implemented in a system having an application server providing a front end for an on-demand database service capable of supporting multiple tenants, the present implementations are not limited to multi-tenant databases nor deployment on application servers. Implementations may be practiced using other database architectures, i.e., ORACLE®, DB2® by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A computer program product comprising computer-readable program code of a mobile application, the computer-readable program code capable of being executed by one or more processors of a mobile device when retrieved from a non-transitory computer-readable medium, the program code comprising instructions configurable to cause:

providing a current computing session for a user to interact with a database system through the mobile application using the mobile device;

processing captured behavioral data indicating one or more behavioral characteristics exhibited by the user with one or more previous interactions by the user with a first subset of a plurality of data objects stored in a database of the database system, the previous interactions having occurred during a previous computing session in which the user interacted with the database system using a computing device different from the mobile device, the first subset of data objects being customer relationship management (CRM) records of a plurality of CRM record types;

retrieving information identifying the first subset of data objects as associated with the previous computing session;

displaying, in a user interface on a display of the mobile device, a presentation of the information identifying the first subset of data objects, the presentation comprising a list of the CRM record types of the first subset of data objects, each listed CRM record type being user-selectable via the mobile device;

processing user input selecting one of the listed CRM record types;

identifying a second subset of the first subset of data objects as being of the selected CRM record type;

displaying, in the user interface, a presentation of information identifying the second subset of data objects;

processing a user-submitted request to search the second subset of data objects, the request comprising a search term;

retrieving a result set of data objects based on the request, each data object in the result set satisfying the search term; and displaying, in the user interface, information identifying the result set of data objects.

2. The computer program product of claim 1, the instructions further configurable to cause:

processing a selection of one of the result set of data objects identified in the user interface; and displaying an information item comprising object information for the selected data object in the user interface on the display.

3. The computer program product of claim 1, wherein the first subset of data objects are identified in the user interface in a sequential order, the sequential order based at least in part on the captured behavioral data.

4. The computer program product of claim 3, wherein the sequential order is based at least in part on an order of one or more previous selections of the data objects in the first subset.

5. The computer program product of claim 1, wherein the captured behavioral data indicates a number of times of previous interactions by the user with the data objects in the first subset.

6. The computer program product of claim 1, wherein the mobile device is one of: a smartphone, a tablet, a laptop, a wearable device, a cell phone, or a personal digital assistant (PDA).

7. A system comprising:

a server associated with an on-demand database system; and a mobile device comprising: a display, one or more processors and a computer-readable medium storing computer-readable program code of a mobile application, the computer-readable program code capable of being executed by the one or more processors, the program code comprising instructions configurable to cause:

providing a current computing session for a user to interact with the database system through the mobile application using the mobile device;

processing captured behavioral data indicating one or more behavioral characteristics exhibited by the user with one or more previous interactions by the user with a first subset of a plurality of data objects stored in a database of the database system, the previous interactions having occurred during a previous computing session in which the user interacted with the database system using a computing device different from the mobile device, the first subset of data objects being customer relationship management (CRM) records of a plurality of CRM record types;

retrieving information identifying the first subset of data objects as associated with the previous computing session;

displaying, in a user interface on a display of the mobile device, a presentation of the information identifying the first subset of data objects, the presentation comprising a list of the CRM record types of the first subset of data objects, each listed CRM record type being user-selectable via the mobile device;

processing user input selecting one of the listed CRM record types;

identifying a second subset of the first subset of data objects as being of the selected CRM record type;

displaying, in the user interface, a presentation of information identifying the second subset of data objects;

processing a user-submitted request to search the second subset of data objects, the request comprising a search term;

retrieving a result set of data objects based on the request, each data object in the result set satisfying the search term; and displaying, in the user interface, information identifying the result set of data objects.

8. The computer program product of claim 1, wherein the one or more previous interactions comprise one or more of: accessing data of a data object, updating an attribute of a data object, updating an attribute of a child object associated with a data object, creating a data object, deleting a data object, searching data objects having a first type, or advancing a workflow associated with a data object.

9. The system of claim 7, wherein the first subset of data objects are identified in the user interface in a sequential order, the sequential order based at least in part on the captured behavioral data.

10. The system of claim 9, wherein the sequential order is based at least in part on an order of one or more previous selections of the data objects in the first subset.

11. The system of claim 7, wherein the captured behavioral data indicates a number of times of previous interactions by the user with the data objects in the first subset.

12. The system of claim 9, the computing device being one of a desktop computer, a laptop computer, or a further mobile device.

13. The computer program product of claim 1, wherein the CRM record types comprise one or more of: a lead, a case, an account, an opportunity, a task, a contact, a campaign, a contract, an event, or a custom object.

14. A computer implemented method comprising:
providing a current computing session for a user to interact with a database system through a mobile application using a mobile device;
processing captured behavioral data indicating one or more behavioral characteristics exhibited by the user with one or more previous interactions by the user with a first subset of a plurality of data objects stored in a database of the database system, the previous interactions having occurred during a previous computing session in which the user interacted with the database system using a computing device different from the mobile device, the first subset of data objects being customer relationship management (CRM) records of a plurality of CRM record types;
retrieving information identifying-the first subset of data objects as associated with the previous computing session;
causing display, in a user interface on a display of the mobile device, of a presentation of the information identifying the first subset of data objects, the presentation comprising a list of the CRM record types of the first subset of data objects, each listed CRM record type being user-selectable via the mobile device;
processing user input selecting one of the listed CRM record types;
identifying a second subset of the first subset of data objects as being of the selected CRM record type;
causing display, in the user interface, of a presentation of information identifying the second subset of data objects;
processing a user-submitted request to search the second subset of data objects, the request comprising a search term;
retrieving a result set of data objects based on the request, each data object in the result set satisfying the search term; and
causing display, in the user interface, of information identifying the result set of data objects.

15. The computer implemented method of claim 14, wherein the first subset of data objects are identified in the user interface in a sequential order, the sequential order based at least in part on the captured behavioral data.

16. The computer implemented method of claim 15, wherein the sequential order is based at least in part on an order of one or more previous selections of the data objects in the first subset.

17. The computer implemented method of claim 14, wherein the captured behavioral data indicates a number of times of previous interactions by the user with the data objects in the first subset.

18. The computer implemented method of claim 14, further comprising:
processing a selection of one of the result set of data objects identified in the user interface; and
displaying an information item comprising object information for the selected data object in the user interface on the display.

19. The computer implemented method of claim 14, wherein the one or more previous interactions comprise one or more of: accessing data of a data object, updating an attribute of a data object, updating an attribute of a child object associated with a data object, creating a data object, deleting a data object, searching data objects having a first type, or advancing a workflow associated with a data object.

20. The computer implemented method of claim 14, wherein the CRM record types comprise one or more of: a lead, a case, an account, an opportunity, a task, a contact, a campaign, a contract, an event, or a custom object.

* * * * *